United States Patent [19]
Sutterlin et al.

[11] Patent Number: 5,263,050
[45] Date of Patent: Nov. 16, 1993

[54] ADAPTIVE THRESHOLD IN A SPREAD SPECTRUM COMMUNICATIONS SYSTEM

[75] Inventors: Philip H. Sutterlin, San Jose; Amy O. Hurlbut, San Francisco, both of Calif.

[73] Assignee: Echelon Corporation, Palo Alto, Calif.

[21] Appl. No.: 942,646

[22] Filed: Sep. 9, 1992

[51] Int. Cl.⁵ .................... H04L 27/30; H04K 1/00
[52] U.S. Cl. .................................... 375/1; 380/34
[58] Field of Search .................. 375/1; 380/34; 455/226.2

[56] References Cited

U.S. PATENT DOCUMENTS

| | | | |
|---|---|---|---|
| 3,706,933 | 12/1972 | Bidell et al. | 375/1 |
| 4,363,138 | 12/1982 | Franklin et al. | 455/226.2 |
| 4,538,281 | 8/1985 | Rajan | 375/1 |
| 4,918,690 | 4/1990 | Markkula, Jr. et al. | 370/94 |
| 5,016,255 | 5/1991 | Dixon et al. | 375/1 |
| 5,022,047 | 6/1991 | Dixon et al. | 375/1 |
| 5,029,183 | 7/1991 | Tymes | 375/1 |
| 5,157,687 | 10/1992 | Tymes | 375/1 |
| 5,164,959 | 11/1992 | Cai et al. | 375/1 |
| 5,181,226 | 1/1993 | Cantwell | 375/1 |
| 5,218,620 | 6/1993 | Mori et al. | 375/1 |

Primary Examiner—Salvatore Cangialosi
Attorney, Agent, or Firm—Blakely, Sokoloff, Taylor & Zafman

[57] ABSTRACT

A transceiver for transmitting and receiving spread spectrum signals having an adaptive threshold for distinguishing between valid receive data signals and noise. The transceiver includes a transmitter for transmitting spread spectrum signals and a receiver for receiving spread spectrum signals. A correlator correlates a received signal against an expected receive pattern. The correlation of the received signal is compared to a threshold value. If the correlation exceeds the threshold value, a carrier detect signal is generated. The number of false carrier detect signals occurring within a predetermined period of time is determined. The threshold value is varied according to the number of false carrier detects.

21 Claims, 7 Drawing Sheets

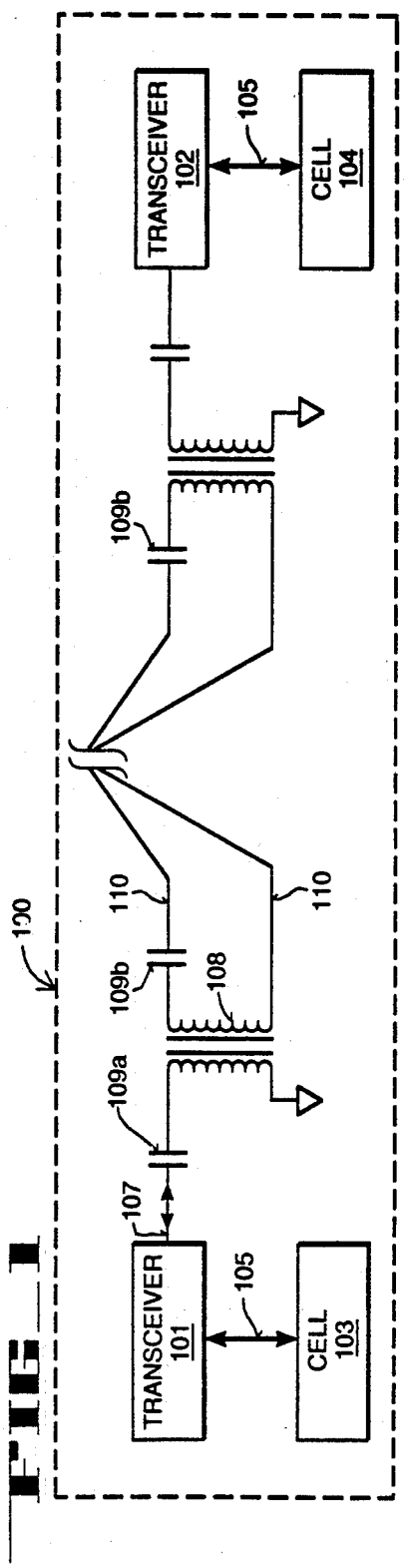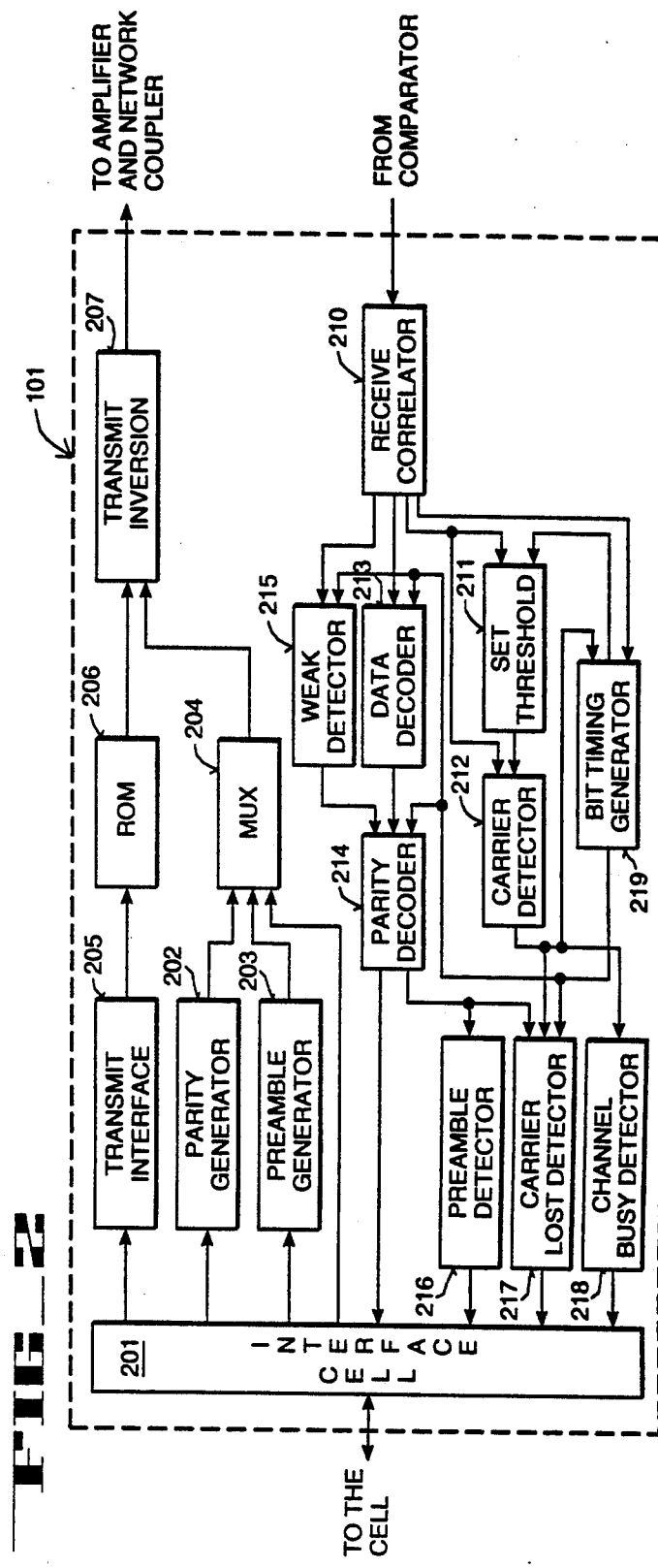

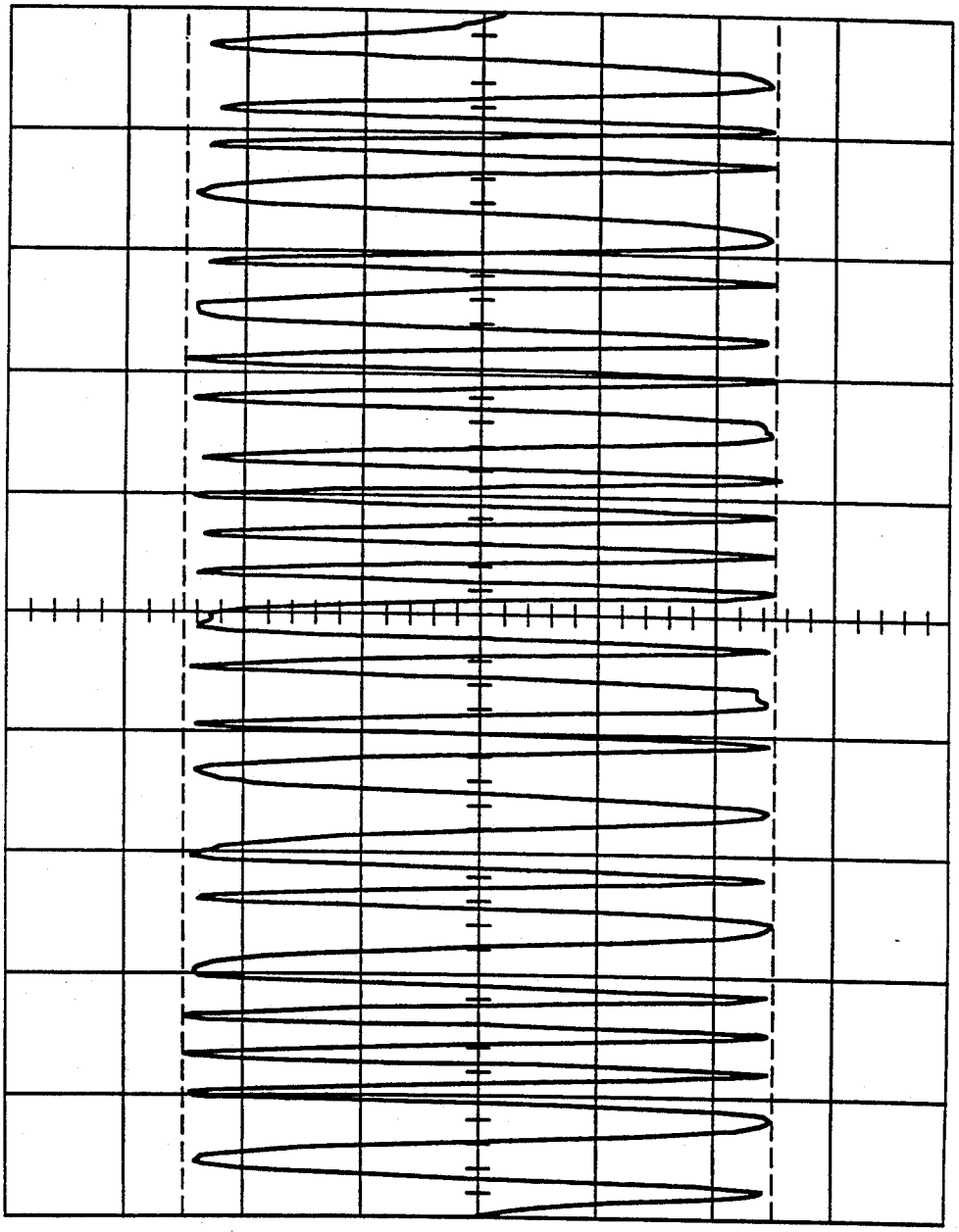
FIG_3

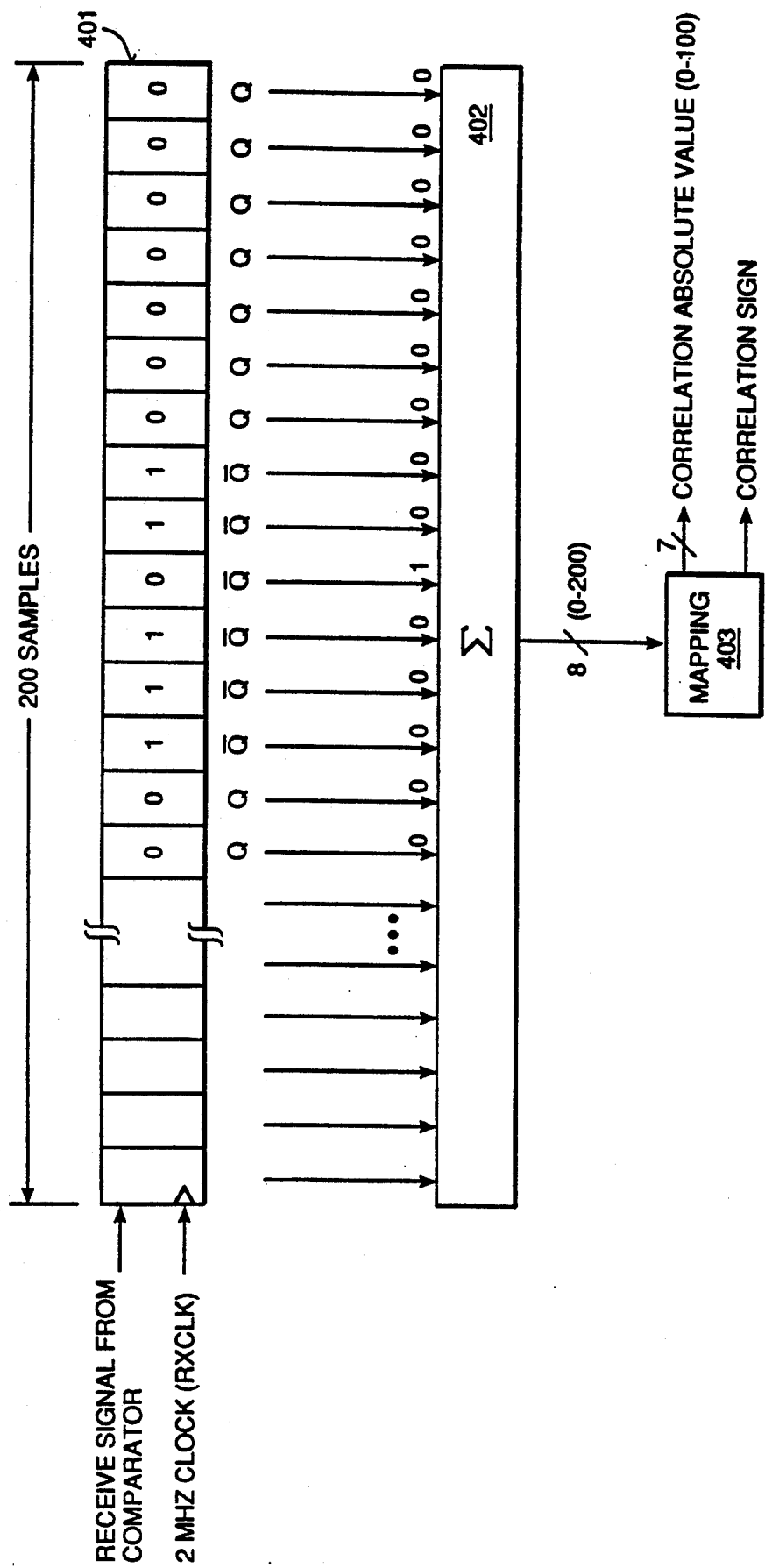
FIG_4.

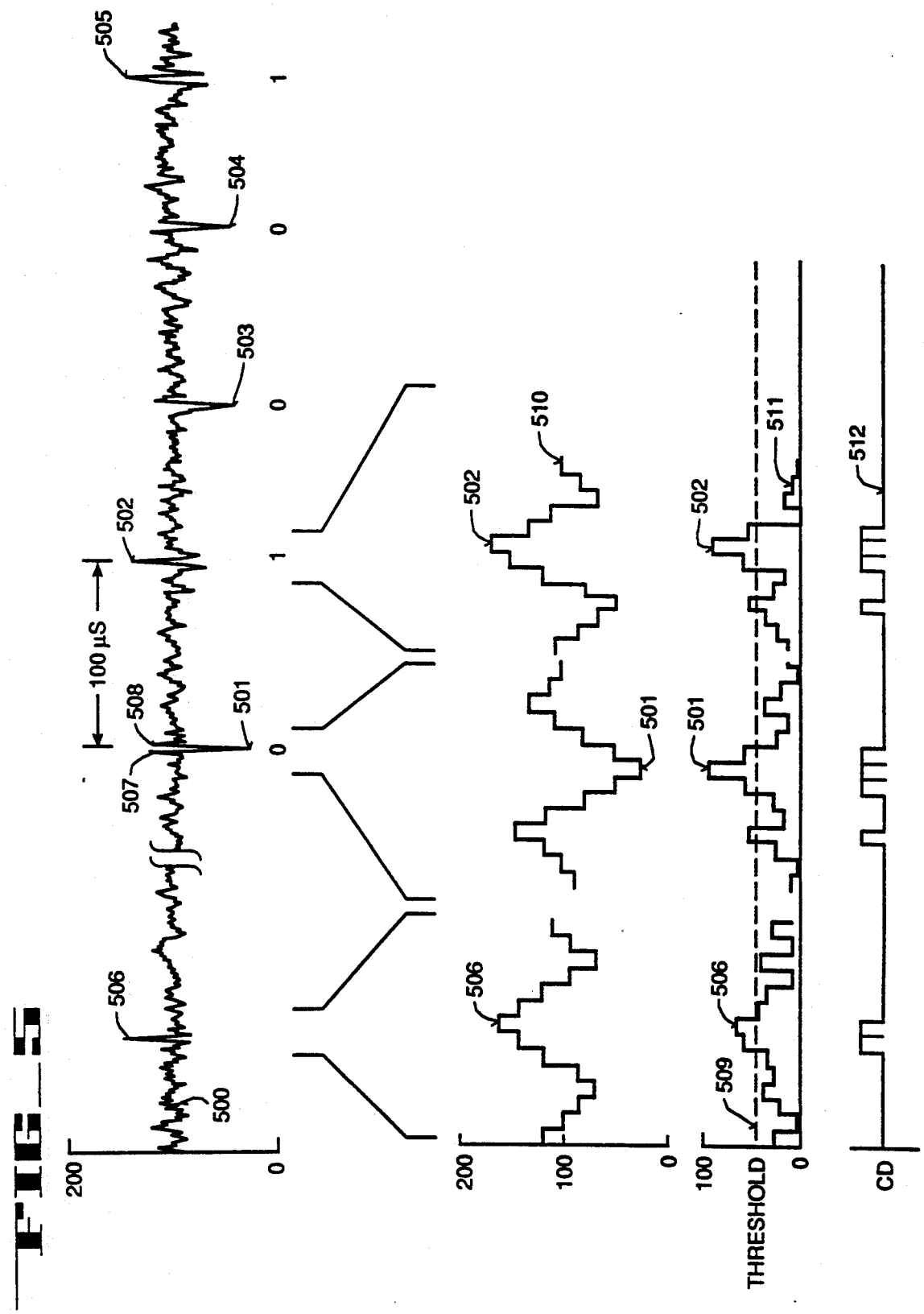

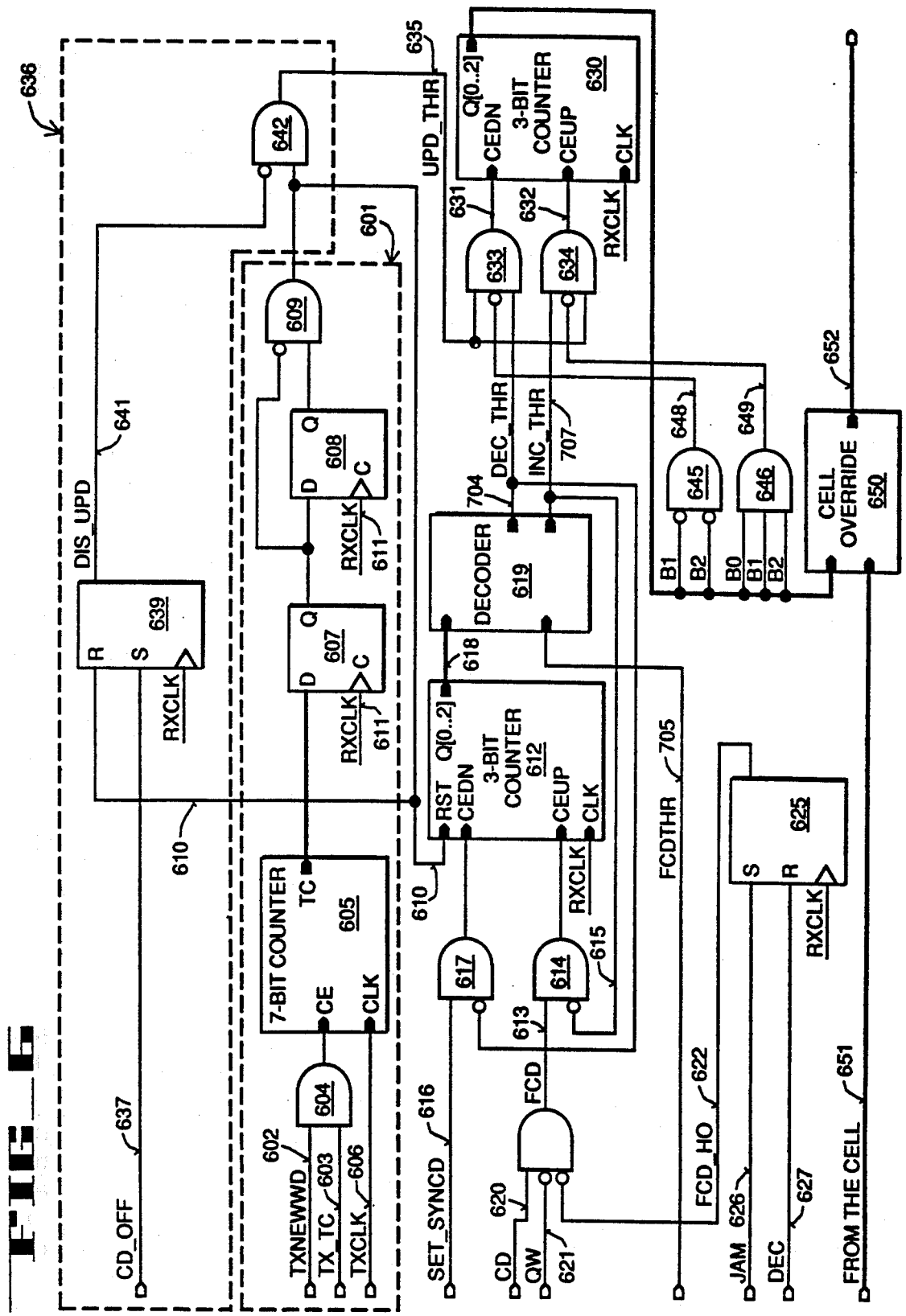

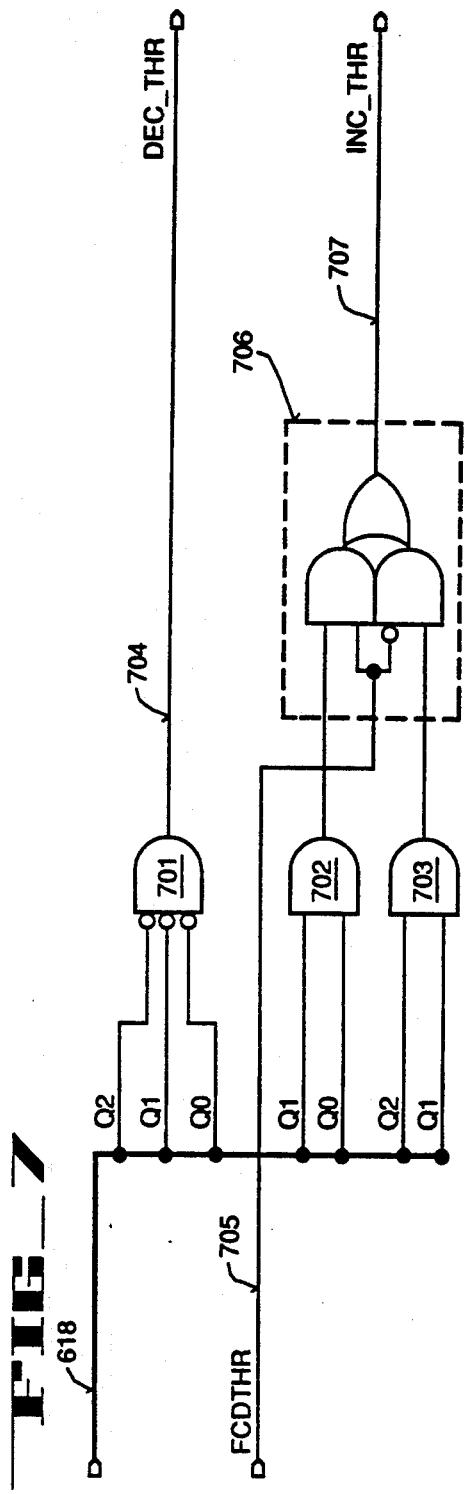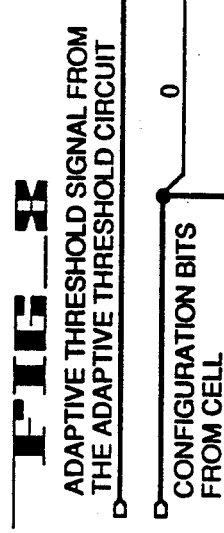
FIG_7
FIG_8

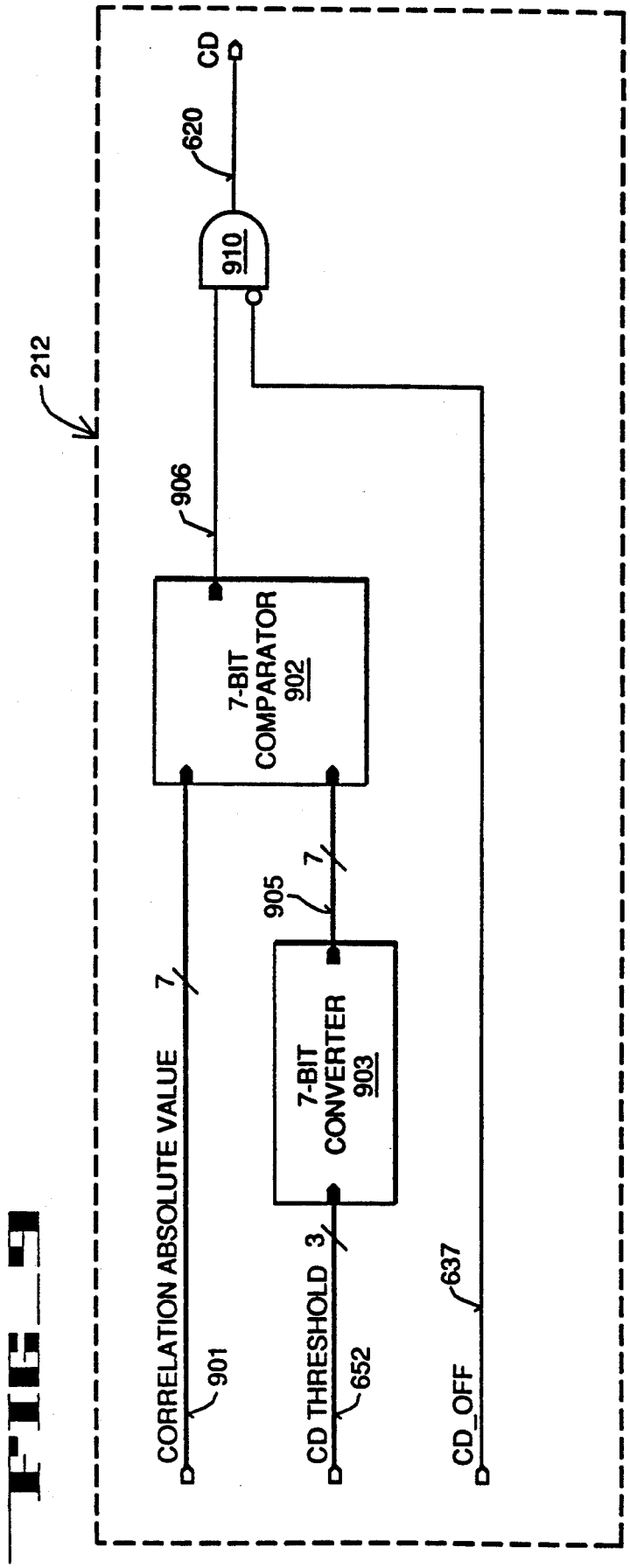

ADAPTIVE THRESHOLD IN A SPREAD SPECTRUM COMMUNICATIONS SYSTEM

FIELD OF THE INVENTION

The present invention pertains to the field of spread spectrum communications on a network system. More particularly, the present invention relates to a threshold for differentiating between valid data and noise, wherein the threshold is adaptive to the network environment.

BACKGROUND OF THE INVENTION

Typically, communications between various terminals on a network are transmitted through dedicated medium such as coaxial cables, twisted pair wires, and fiber optic cables. These media can sometimes be expensive as they have to meet stringent transmission criteria. In addition, significant costs are incurred for physically routing the medium to each of the various terminals. Hence, it would be beneficial if the terminals could take advantage of an already existing medium for communication purposes.

One such medium is power distribution lines such as those found in virtually all homes, offices, and factories. In many cases these power lines distribute 120 volt AC (alternating current) to wall sockets, thereby supplying power to various devices such as appliances, computers, lights, etc. Because power lines are designed primarily for transmitting power, they are not ideally suited for communications. One major problem is that noise on power lines can be quite high due to electrical interference emanating from the very devices being powered.

In the prior art, spread spectrum communications techniques have been utilized in noisy environments, including power lines. Spread spectrum involves transmitting communications signals over a frequency spectrum that is purposely made broad with respect to the information bandwidth. The signal is subsequently despread and decoded at the receiving end. In this manner, spread spectrum receivers have the highly desirable ability to enhance the expected signal while suppressing the effects of all other inputs.

In order to distinguish data from noise and to maximize the output signal to noise ratio (SNR), a correlation function is typically implemented at the receive end. The correlation function compares signals on the power line against an expected signal. Ideally, noise does not match the expected waveform, and valid signals result in perfect matches. Unfortunately noise does, by its random nature, occasionally exhibit a measure of correlation to the expected signal (e.g., sometimes as much as 50% correlation). Equally unfortunate is the fact that signals propagating through power distribution lines are frequently attenuated and distorted. When received in conjunction with typical noise, these valid signals frequently exhibit low correlations (e.g., sometimes as low as 30%). Thus, noise might be misinterpreted as valid data and vice versa.

In response, spread spectrum receivers, typically employ a correlation threshold function which either by itself or in conjunction with other criteria, are used in an attempt to reliably distinguish valid signals from noise. The output of this threshold function process is a carrier detect signal which indicates the likely presence of valid data signals. Even so, false carrier detects can occur whenever noise has a correlation value exceeding the threshold. A false carrier detect can trigger the receiver to erroneously synchronize on the noise and thereby miss a real data packet. Another problem is that when a carrier is detected on a CSMA network (Carrier Sense Multiple Access—a network access method wherein multiple transceivers share a medium), a channel busy indicator is typically generated to keep the transmitter from transmitting and causing a collision. Consequently, false carrier detections reduce the overall network throughput.

The goal then is to fix a correlation threshold such that random noise does not trigger a carrier detect indication, while valid receive signals of less than ideal correlation do trigger carrier detect indications. However, there is a dilemma in choosing a value for setting the threshold. On the one hand, the threshold should be set at a low level in order to detect weak and/or distorted signals which are valid and have relatively low correlations. On the other hand, setting the threshold at too low a level risks having random noise breaking the threshold too frequently. Fixing a threshold is thus a compromise between either setting the threshold low enough to pick up signals having weak correlations but also falsely picking up noise or, conversely, setting the threshold high enough so that noise is not picked up but receive sensitivity is degraded.

Further complicating matters is the fact that the optimum threshold can vary, depending on the network environment. For example, one receiver may be operating in an environment having noise with a great degree of correlation, yet valid signals are strong and clean. The correlation threshold should be set relatively high in such situations. Conversely, for environments where the background noise has a low degree of correlation and signals are weak and distorted, the threshold should be set relatively low. Moreover, the network environment can change over time.

Therefore, what is needed is an apparatus and method for selecting an optimum threshold. It would also be highly preferable for the apparatus and method to be adaptive to its operating environment without adding a great deal of complexity. An adaptive threshold should increase the threshold level when noise having a relatively high degree of correlation is present. Although it is apparent which parameter needs to be adapted (i.e., the carrier detect threshold), it is rather difficult to determine exactly how that parameter is to be adapted. In particular, it is difficult to determine what kind of information to use as a basis for setting the threshold.

SUMMARY AND OBJECTS OF THE INVENTION

In view of the problems associated with communicating data in a hostile environment, such as power lines, one object of the present invention is to provide an apparatus and method for setting a correlation threshold at an optimum level to differentiate between valid receive data signals, which have been attenuated and distorted in the transmission process versus random noise having characteristics similar to those of valid data signals.

Another object of the present invention is to adapt the threshold to its current operating environment.

Another object of the present invention is to increase the threshold when the noise has a relatively high degree of correlation to a valid data signal and to decrease the threshold when the noise has a relatively low degree of correlation to valid data signals.

These and other objects of the present invention are implemented in a transceiver which transmits and receives spread spectrum signals. When a terminal on a communications network wishes to transmit digital data, its transceiver encodes each bit of data as a characteristic waveform. The characteristic waveform is a spread spectrum signal representing one bit of information. It is this waveform which is coupled to the transmission medium (e.g., a power line). The transceiver also includes a receiver for detecting and decoding spread spectrum signals. Received signals are passed through a correlator which compares (i.e., correlates) a received signal against a known expected receive signal (or reference pattern). The reference pattern is based on the characteristic waveform used in the transmission process. Received signals are assigned correlation values indicating their likelihood of being a valid data signal as opposed to being random noise.

Initially, a threshold value is selected in an attempt to distinguish between valid data signals which have become distorted and random noise which happens to resemble a valid data signal. Received signals exceeding the threshold have relatively high degrees of correlation, and carrier detect signals are generated for those signals exceeding the threshold.

In the currently preferred embodiment, a counter is implemented to determine the number of false carrier detects occurring within a 218 msec interval. False carrier detects are determined by generating a plurality of narrow timing windows which follow and are synchronized to the first carrier detect of an incoming packet. The windows are spaced according to the transmission rate, such that each carrier detect within a valid data packet is expected to fall within a window. Hence, carrier detects falling outside these timing windows are deemed to be false carrier detects. The counter is reset to zero at the start of each 218 msec interval and is incremented for each false carrier detect. Since it is unknown at the time when the first carrier detect of a new incoming message occurs whether it is valid or false, it is always initially assumed to be false, and the counter is incremented. However, if subsequent carrier detects fall within the timing windows, this indicates that the first carrier detect was part of a valid data packet, and the counter is decremented to offset the incorrect assumption.

The threshold is adjusted at the end of the 218 msec interval according to the number of false carrier detects which had occurred in that interval. For example, if there were no false carrier detects, the threshold can be lowered by 3%. If six or more false carrier detects had occurred, the threshold can be increased by 3%. In this manner, the threshold is continually being adapted to its current operating to maximize environment. Furthermore, the threshold is optimized to maximize receive sensitivity while regulating the density of false carrier detects to a level which has insignificant effect on network throughput.

One feature of the present invention is that it is able to adapt and optimize the threshold even when the channel is flooded with valid data packets. This is possible since the narrow windows used to encompass carrier detects, caused by valid data, are small relative to one bit time. This then leaves the majority of each bit time available for examination of false carrier detects.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a typical communications network which can utilize the present invention.

FIG. 2 is a block diagram of an example spread spectrum transceiver upon which the currently preferred embodiment of the present invention can be practiced.

FIG. 3 illustrates an example spread spectrum characteristic waveform representing one bit of information.

FIG. 4 is a block diagram illustrating a receive correlator.

FIG. 5 illustrates graphs of sample correlation signals.

FIG. 6 is a circuit diagram illustrating a carrier detect threshold generator.

FIG. 7 is a circuit diagram illustrating a decoder for decoding signals which indicate a quantity of false carrier detects into an increment/decrement threshold signal.

FIG. 8 is a circuit diagram illustrating how a cell controller can override the adaptive threshold with a fixed threshold.

FIG. 9 is a circuit diagram illustrating the generation of the carrier detect signal.

DETAILED DESCRIPTION

An adaptive threshold in a spread spectrum network system employing a correlation function is described. In the following description, for purposes of explanation, numerous specific details are set forth, such as timing frequencies, update periods, sample rates, transmission rates, correlation values, threshold levels, etc., in order to provide a thorough understanding of the present invention. It will be obvious, however, to one skilled in the art that these specific details need not be used to practice the present invention. In other instances, well-known structures and circuits have not been shown in detail in order to avoid unnecessarily obscuring the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

There are a number of commercially available products which provide sensing, control, and communications in a network environment. These products range from elaborate systems having a large amount of intelligence to more simple and less expensive systems. One example of such a system, comprising a network of intelligent cells in which the cells sense, control, and communicate, is described in U.S. Pat. No. 4,918,690 of Markkula, Jr. et al.

Referring to FIG. 1, a typical application of the present invention within transceivers 101 and 102 of a communications network 100 is illustrated. Communications network 100 is comprised of a plurality of intelligent cells 103 and 104. In general, cells are programmable semiconductor chips providing remote control, sensing and communication functions. When interconnected via transceivers, the collaboration of cells have distributed sensing, communication, control, and configuration capabilities.

Groups of cells within a network perform particular functions. For example, cells 103 and 104 can provide control between a light switch and a light. When the light switch is operated, cell 103 sends a digital code on lines 105 to transceiver 101. When transceiver 101 receives the digital message from cell 103, it transmits the message in a coded format on line 107 to a coupling network, such as transformer 108 and AC coupling capacitors 109a and 109b. The message is then conducted via medium 110, such as a power line. Once transceiver 102 receives the coded data, it proceeds to decode the received signal and relays the message by way of a digital bit stream on line 105 to cell 104. Thereupon, cell 104 switches the light on/off.

FIG. 2 is a block diagram of a transceiver 101 upon which the currently preferred embodiment of the present invention can be practiced. Cell interface 201 provides the interface between the cell and the transceiver 101. The cell initiates a data packet transmission by sending a request to transmit to cell interface 201. Cell interface 201 responds to the cell by either accepting or denying its request to transmit based on examination of the output of channel busy detector 218. If the cell's request to transmit is accepted, as a result of the transceiver determining that the channel is not busy, then the cell begins sending data bytes to cell interface 201. The cell interface 201 passes the data bytes to the parity generator 202. Additionally, preamble generator 203 generates a preamble which is transmitted at the beginning of each packet. The preamble is comprised of three sections. One section is used for collision resolution. The other two sections are used to qualify bit timing and establish word timing. The preamble is routed through multiplexer 204 which appends the data and parity bits to the preamble. Thus, the serial data stream output of multiplexer 204 is comprised of a preamble followed by data words, each word comprising 16 bits of data and one parity bit (except when a packet is comprised of an odd number of bytes, in which case a single parity bit is appended to the last—i.e. odd-byte).

In order to implement a spread spectrum system, each data bit to be transmitted (including preamble and parity bits) corresponds to a transmitted characteristic waveform. The characteristic waveform is preselected such that it spreads the energy of one bit of information over the desired frequency range. FIG. 3 illustrates a sample characteristic waveform 300.

Referring back to FIG. 2, a digital representation of the characteristic waveform (or coded characteristic waveform) is stored in read only memory (ROM) 206, as 500 bytes of data. Transmit interface 205 addresses ROM 206 so that the coded characteristic waveform is properly output from ROM 206 to the transmit inversion block 207. For each data bit, the coded characteristic waveform or its inverse is clocked out of the transmit inversion block 207. For each data bit which is a "1," the coded characteristic waveform is clocked out unmodified. Otherwise, for each data bit which is a "0," the coded characteristic waveform is inverted. In other words, the output from the transmit inversion block 207 is a series of coded characteristic waveforms or inverted characteristic waveforms as defined by the serial data stream form multiplexer 204. The output from the transmit inversion block 207 is then output from the transceiver. It undergoes a digital to analog conversion, is amplified, and the characteristic waveform is finally coupled onto the power line via a coupling interface.

Transceiver 101 also decodes received signals. External to transceiver 101 signals are coupled off of the power line by means of a coupling interface. One of the coupling interface's primary functions is to separate the high frequency communication signals from the lower frequency (e.g., 60Hz) power distribution signals. The received high frequency signals are then processed through a front-end circuit which filters and amplifies them. In addition, just prior to transceiver 101, the signals are quantized in amplitude. In its simplest, and currently preferred embodiment, amplitude quantization involves slicing the filtered and amplified receive signal about its midpoint, thus creating a two-level quantized signal. A single comparator is all that is required to provide this simple quantization function. If the received signal is above the midpoint, a high signal is output by the comparator. Otherwise, the comparator outputs a low signal. Ideally, given no distortion of the data signal, the output of the comparator would resemble a squared-up version of the transmitted characteristic waveform.

The processed signal from the comparator is input to the correlator 210 of transceiver 101. Correlator 210 correlates a receive signal with a representation of the expected receive waveform. In theory, valid data signals would have 100% correlation and noise would have 0% correlation. In practice, a received signal will have been attenuated, distorted, and subjected to additive noise thus reducing its correlation to the expected receive waveform. Furthermore, background noise might have some degree of correlation due to its random nature. Hence, set threshold block 211 selects a particular threshold for discriminating between valid data signals which have been corrupted and background noise. The threshold is adaptive in the sense that when noise having a relatively high degree of correlation is present, the threshold level is increased to minimize the impact of mistaking noise for valid data. Conversely, if the background noise has a relatively low degree of correlation, the threshold level is decreased in order to increase the transceiver's sensitivity and thus its overall performance.

Set threshold block 211 determines the threshold level by counting the number of times that noise breaks the threshold (i.e., false carrier detects) over a period of time. The method by which a carrier detect is determined to be false will be described shortly. The threshold level is then either lowered, maintained at its present level, or increased, depending on the number of false carrier detects for that period of time. Set threshold block 211 continuously updates the threshold value. The threshold value is sent to carrier detector 212 which determines when a correlation exceeds the threshold. The received signals are then decoded by data decoder 213 in conjunction with bit timing generator 219. A more detailed description of the data decoder and the bit timing generator is found in the co-pending patent application entitled "Adaptive Data Recovery for Spread Spectrum Systems," filed concurrently herewith, which application is assigned to the assignee of the present invention.

Preamble detector 216 decodes the word synchronization segment of the preamble to establish the framing of the bytes within a data packet. Parity decoder 214 and weak bit detector 215 are used in combination to provide error correction capability. The weak bit detector 215 keeps track of which data bit of a particular word has the lowest correlation. If the parity check indicates that an error occurred, the error is probably caused by the weakest bit. Thus, to correct the error, the weakest bit is inverted. This error correction technique is described in detail in the co-pending patent application entitled "Error Correction in a Spread Spectrum Transceiver," filed concurrently herewith and assigned to the assignee of the present invention. The decoded, corrected, signal is then sent to the cell via cell interface 201.

Other blocks include carrier lost detector 217, and bit timing generator 219. Carrier lost detector 217 determines the end of a received transmission. Bit timing generator 219 sets up timing and window signals which are used by the various blocks. A more detailed description of transceiver 101 is set forth in the co-pending patent application entitled "Adaptive Data Recovery for Spread Spectrum Systems," filed concurrently herewith.

Of particular significance to the present invention are the receive correlator 210, set threshold 211, and carrier detector 212 blocks. A more detailed description of each of these blocks is set forth below.

FIG. 4 is a block diagram illustrating a receive correlator. The receive correlator is comprised of shift register 401, a summer 402, and a mapping block 403. In the currently preferred embodiment of the present invention, the transmission rate on the power line is 10K bits per second (bps). The transmit waveform is spread across a spectrum of approximately 100K to 450 KHz. Although, according to the Nyquist theorem, the transmit waveform can be sampled at twice its highest frequency without losing any information, a sampling rate of approximately 4:1 is implemented in the present invention to provide greater resolution. Hence, the received signal is sampled at 2.0 MHz (i.e., over four times the highest frequency of the waveform). Given a 2.0 MHz sampling rate and a data bit period of 100 $\mu$s, shift register 401 is made 200 bits long in order to hold one data bit of information. The significance of shifting in one data bit of information is to permit each data bit's waveform to be compared against a stored reference pattern of an ideal receive data bit. This comparison is known as a correlation.

Consequently, the shift register contains a quantized version of the signal that was on the power line for the past 100 $\mu$s (i.e., one bit time). A new picture of the signal on the power line in the past 100 $\mu$s is shifted into shift register 401 every 500 nsec. For each shift a correlation is performed on the sampled signal to determine its correlation value. The correlation value is subsequently used to determine whether the signal on the power line is a valid data bit or whether it is noise.

In the currently preferred embodiment, the sampled signal in shift register 401 is compared against the expected receive waveform (reference pattern) by taking either the Q or $\overline{Q}$ output from shift register 401. This reference pattern determines which of the two outputs, Q or $\overline{Q}$, is to be taken. For example, if fifteen consecutive bits of the 200 bit reference pattern were 001111110000000, the corresponding shift register 401 outputs would be Q, Q, $\overline{Q}$, $\overline{Q}$, $\overline{Q}$, $\overline{Q}$, $\overline{Q}$, $\overline{Q}$, Q, Q, Q, Q, Q, Q, Q. A Q output corresponds to the current value of that particular sample bit in the shift register, whereas a $\overline{Q}$ output corresponds to taking the inverse of that particular sample bit in the shift register. In other words, if the sampled bit matches the reference bit, shift register 401 outputs a 0 for that shift register location. Otherwise, a 1 is output. Continuing out example, if 15 bits of the shift register were 001110110000000 and the corresponding reference pattern as 001111110000000 there would be one mismatch. This level of matching (or correlation) would appear as 14 zeros and 1 one out of shift register 401, as illustrated in FIG. 4.

The 200 outputs from shift register 401 are fed into summer 402, which counts the number of 1's. The output from summer 402 can range from 0–200, where 0 corresponds to a perfect match and 200 corresponds to a perfect mismatch. Note that both total mismatches and total matches correspond to valid data bits, given that either the characteristic waveform or its inverse is being transmitted, depending on whether the data bit is a 1 or a 0 respectively. Since in the currently preferred embodiment, the reference pattern is defined by the inverse of the characteristic waveform, a perfect match indicates that a bit transmitted with the inverse waveform was received. This results in 0 at the output of summer 402.

The output of summer 402 is input to mapping circuitry 403 which converts it into a correlation absolute value and sign indication. The absolute value of the correlation is determined by subtracting 100 from the output of the summer and then taking its absolute value. The result is a 7-bit signal ranging from 0 to 100, where 0 corresponds to no correlation (e.g., noise) and 100 corresponds to 100% correlation (e.g., an ideal receive data bit). Hence, a high absolute correlation value indicates that there is probably valid data on the power line, and a low absolute correlation indicates that there is probably noise on the power line. Mapping circuit 403 also outputs a single sign bit based on the sign of the result after 100 had been subtracted. The sign bit is used to decode the data, as described in the co-pending patent application entitled "Adaptive Data Recovery for Spread Spectrum Systems," filed concurrently herewith.

FIG. 5 is a graph illustrating a typical correlation output. Given an input data stream of 01001 with each data bit time being 100 $\mu$s, the correlator samples the received signal every 500 ns. This input signal is correlated with the reference pattern every 500 ns. The upper-most signal illustrates a typical output 500 from the summer, showing also a period of time prior to the arrival of the input data stream. Note that due to the properties inherent to the transmitted waveform for each valid data bit, there is a center lobe and a pair of sidelobes. For example, sidelobes 507 and 508 straddle center lobe 501. Thus, in FIG. 6 each valid data bit is represented by a triplet peak in correlation values, wherein 0's have downward center lobes and 1's have upward center lobes. Note that when no valid receive signal is present, the residual noise might occasionally have a relatively high correlation 506. Multiple correlation peaks for each data bit are characteristic of the currently preferred embodiment.

The second graph illustrates a more detailed depiction (expanded in time view) of the correlation peak 506, resulting from noise, and the correlation triplets of the first two data bits of output signal 500. Peaks 501 and 502 correspond to data bits 0 and 1, respectively.

Next, a graph of the correlator's absolute value output from the mapping circuit is illustrated as signal 511. Again, peaks 501 and 502 correspond to data bits. A threshold level 509 is set to differentiate between noise and a valid incoming packet of data bits. Correlations above threshold 509 trigger a carrier detect indication and are interpreted as an indication of a probable incoming data packet, whereas correlations below the threshold are interpreted as noise. Note that occasionally noise, such as the noise which produced correlation peak 506, can break threshold 509. Such instances are called false carrier detects. The bottom graph illustrates a carrier detect (CD) signal 512 corresponding to received signal 500.

FIG. 6 is a circuit diagram of the set threshold block. The set threshold circuit adaptively varies the threshold level according to the number of false carrier detects within a predefined time period. In the currently preferred embodiment, this time period is set to 218 msec. Block 601 generates the 218 msec timing signal. The signal TXNEWWD, on line 602, pulses high for 100 µs every 1.7 msec, originating from the preamble generation transmit path for framing 17 bits (i.e., 16 information bits+1 parity bit=17 bits at 100 µsec per bit=1.7 msec.), and is used to generate the 218 msec timing signal. The TX_TC signal, on line 603, pulses high for one transmit clock (TXCLK) period every 100 µsec, thereby providing an indication of one bit time synchronous to the transmit clock. TXNEWWD line 602 and TX_TC line 603 are input to AND gate 604. The output of AND gate 604 is used to enable counter 605 and is active for one transmit clock period every 1.7 msec. Counter 605 is a 7-bit counter and is clocked by the transmit clock. The counter increments every 1.7 msec; thus the 7-bit counter reaches its terminal count every 128 counts * 1.7 msec=218 msec, at which time the counter rolls over. In alternative embodiments, the transmission rate can be made faster or slower, while maintaining the 218 msec period. Flip-flops 607–608 and AND gate 609 are implemented to re-synchronize the terminal count of the counter 605 to the 2.0 MHz receive clock RXCLK line 611. Hence, the output 610 is active for one receive clock period (i.e., 500 nsec) every 218 msec.

3-bit counter 612 is used for counting the number of false carrier detects within the 218 msec period. It is reset at the end of every 218 msec period by the 218 msec timing signal 610. In this manner, counter 612 has an initial value of zero at the start of each 218 msec period. Counter 612 is incremented once for each false carrier detect indicated by the FCD signal on line 613, up to a maximum value.

There are three conditions required for the false carrier detect signal FCD to go high: 1) the correlation value breaks threshold (i.e., a carrier detection), which is indicated by the signal CD on line 620 being high. 2) The hold-off period following the first carrier detect of an incoming packet, which will be discussed shortly, is not active. 3) The narrow window during which the carrier detects associated with incoming data bits occur, which will be discussed in more detail later, is not active.

When a first carrier detect occurs, it is unknown at that instant whether it is valid or false. The present invention initially assumes that the first carrier detect is false and increments counter 612 (unless the counter has reached its maximum value). If it is determined later that the first carrier detect was due to an incoming packet, false carrier detect counter 612 is decremented by one. The determination that the first carrier detect was due to an incoming packet is made when packet synchronization is established, which is defined by the occurrence of multiple threshold breaks at approximately integer multiples of a bit time (100 µs). See the co-pending patent application "Adaptive Data Recovery for Spread Spectrum Systems" filed concurrently herewith for a more detailed definition. Whenever packet synchronization is established for a data packet, the signal SET_SYNCD on line 616 from bit timing generator block goes active, and counter 612 is decremented (as long as the counter is not at zero) to offset the first carrier detect which was incorrectly counted as being false.

Referring back to FIG. 5, it can be seen that for each data bit, there can be multiple carrier detects (i.e., correlations breaking the threshold). The sidelobes are commonly strong enough to break the threshold, and there can be more than one carrier detect corresponding to a center lobe or a side lobe. Thus, a hold-off signal is implemented so that the first incoming data bit increments counter 612 only once, irrespective of how many carrier detects are caused by that data bit. This ensures that only one false carrier detect is counted for the first data bit. As described above, counter 612 can then be decremented by one to compensate for an erroneous assumption.

The hold-off signal is generated by R-S flip-flop 625. Whenever the receive circuit determines there is a first carrier detect of an incoming packet, it causes the bit timing circuit to "jam" itself to a new timing for setting the windows 100 µsec apart. The "JAM" signal on line 626 is input to set the flip-flop 625. A value from a counter in the bit timing generator block 219 is decoded so that it is activated 6 µ sec after the jam. This decode signal "DEC" is input on line 627 to reset flip-flop 625. The result is that the JAM signal sets flip-flop 625, and the DEC signal resets it 6 µsec later. Thus, the output 622 from flip-flop 625 provides a 6 µs hold-off following the first carrier detect of an incoming packet, during which time no additional false carrier detects are counted.

After the first carrier detect occurs, the bit timing generator block generates narrow windows during which the carrier detects associated with incoming data bits are expected occur. These narrow windows are called qualification windows, and, in the currently preferred embodiment, are 11 µs wide and spaced at intervals of one bit time, or 100 µs. While the qualification window is active, as indicated by the signal QW on line 621 being high, any carrier detect is considered a valid carrier detect. When the qualification window is not active, as indicated by the signal QW being low, any carrier detect is considered a false carrier detect (as long as the hold-off period after the first carrier detect is not active). Thus, even while receiving a packet, the transceiver can count false carrier detects for 89 µs out of every 100 µs bit time.

The output 618 from false carrier detect counter 612 is comprised of three bits Q0, Q1, and Q2, which are input to decoder 619. FIG. 7 is a more detailed circuit diagram of decoder 619. AND gate 701 decodes the case wherein Q0-2 are all zeros, which indicates that there were no false carrier detects within the 218 msec period. In this case, the DEC_THR line 704 is activated. Referring back to FIG. 6, the output 704 is input to AND gate 617 to disable false carrier detect counter 612 from decrementing below 0. AND gate 702 decodes the case where Q2, Q1, Q0 are 011 (or 111) to indicate if there were three or more false carrier detects within the 218 msec period. AND gate 703 decodes the case where Q2, Q1, Q0 are 110 (or 111) to indicate six or more false carrier detects within the 218 msec period. The FCDTHR line 705 is controlled by the cell and selects whether the current threshold is incremented when the number of false carrier detects within the 218 msec interval is at least 3 or at least 6. The selection is accomplished by the dual AND gates and the OR gate of block 706. If FCDTHR=0, a count of at least 6 activates the INC_THR line 707. If FCDTHR=1, a count of at least 3 activates the INC_THR line 707. Reffering back to FIG. 6, the output 707 is input to AND gate 614 to disable false carrier detect counter 612 from incrementing above its maximum count, either 3 or 6. Table 1 below illustrates the conditions for setting DEC_THR and INC_THR.

TABLE 1

| Q2 | Q1 | Q0 | FCDTHR | DEC_THR | INC_THR |
|----|----|----|--------|---------|---------|
| 0  | 0  | 0  | X      | 1       | 0       |
| 0  | 0  | 1  | X      | 0       | 0       |
| 0  | 1  | 0  | X      | 0       | 0       |
| 0  | 1  | 1  | 0      | 0       | 0       |
| 0  | 1  | 1  | 1      | 0       | 1       |
| 1  | 0  | 0  | 0      | 0       | 0       |
| 1  | 0  | 0  | 1      | 0       | 1       |
| 1  | 0  | 1  | 0      | 0       | 0       |
| 1  | 0  | 1  | 1      | 0       | 1       |
| 1  | 1  | 0  | X      | 0       | 1       |
| 1  | 1  | 1  | X      | 0       | 1       |

3-bit counter 630 is used to store the current threshold level. The three output bits B0, B1, and B2 of counter 630 represent the current threshold level according to Table 2 below. As shown in Table 2, the threshold can take on seven distinct levels, as represented by counter 630 taking on counts between 1 and 7 (inclusive).

TABLE 2

| B2 | B1 | B0 | Current Threshold Level |
|----|----|----|-------------------------|
| 0  | 0  | 0  | X                       |
| 0  | 0  | 1  | 32%                     |
| 0  | 1  | 0  | 35%                     |
| 0  | 1  | 1  | 38%                     |
| 1  | 0  | 0  | 41%                     |
| 1  | 0  | 1  | 44%                     |
| 1  | 1  | 0  | 47%                     |
| 1  | 1  | 1  | 50%                     |

Upon power up or reset of the transceiver, counter 630 is initialized with a value of 5 (101 binary), resulting is a 44% threshold level. In other words, carrier detects are generated only for those signals having at least a 44% correlation to the reference pattern. Counter 630 can be decremented by one, maintained at its current state, or incremented by one, every 218 msec, in order to adapt the threshold.

The output of AND gate 633 on line 631 controls when counter 630 is decremented, and the output of AND gate 634 on line 632 controls when counter 630 is incremented. For either signal on line 631 or on line 632 to be high requires that the signal UPD_THR, which is the output of block 636 on line 635, is high.

The UPD_THR signal is high when the end of the 218 ms interval has been reached and the transceiver did not transmit during the past 218 ms period. When the transceiver transmits carrier detection is disabled in order that the transceiver does not receive its own transmission. Because all carrier detections are disabled while transmitting, this would result in a skewed false carrier detect count. The false carrier detect count would be skewed low because any false carrier detects occurring during a transmission is missed. The signal DIS_UPD on line 641 is used to indicate whether the transceiver transmitted during the last 218 msec interval. The signal DIS_UPD is the output of the S-R flip-flop 639. The S-R flip-flop 639 is reset at the beginning of each 218 msec interval by the signal on line 610. If during the 218 msec interval the transceiver transmits, then the S-R flip-flop is set. The S-R flip-flop is set by the signal CD_OFF which is high when transmitting. Hence, at the end of each 218 msec interval, the signal DIS_UPD is high if the transceiver transmitted during that interval. The signal UPD_THR is high only if the end of the 218 msec is reached, as indicated by line 610 being high, and DIS_UPD is low.

When UPD_THR is high, counter 630 is decremented by line 631 if two additional conditions are met. First, the output DEC_THR on line 704 from decoder block 619 must be high. Second, the counter 630 must not be at its minimum allowed count of 1. The AND gate 645 decodes the count value on B1 and B2 and is high when both B1 and B2 are low, indicating a count of 1.

When UPD_THR is high, counter 630 is incremented by line 632 if two additional conditions are met. First, the output INC_THR on line 707 from decoder block 619 must be high. Second, the counter 630 must not be at its maximum count of 7. The AND gate 646 decodes the count value on B0, B1, and B2 and is high when all three counter outputs are high, indicating a count of 7.

In summary, the threshold is adapted only if 1) the number of false carrier detects indicate that the current threshold should be decremented or incremented, 2) the end of the 218 ms interval is reached and the transceiver has not transmitted in the past 218 msec period, and 3) the current threshold is not at its minimum value of 1 (the minimum threshold level of 32%) nor at its maximum value of 7 (the maximum threshold level of 50%).

FIG. 8 is a more detailed circuit diagram of the cell override block. The B0-B2 outputs of current threshold counter 630 are also input to the cell override block 650. The function of cell override block 650 is to provide the capability of overriding the adaptive threshold circuit described above. If the 3-bit input 651 from the cell is comprised of all 0's, cell override block 650 passes the output from current threshold counter 630 to lines 652, and the adaptive threshold circuit controls the current threshold. Otherwise, if any of the three bits from the cell is non-zero, cell override block 650 overrides the adaptive threshold circuit and writes a fixed threshold between 1 and 7 on lines 652, as determined by the cell.

FIG. 9 is a circuit diagram of carrier detector 212. The output 652 from cell override block 650 is input to the carrier detector block. The carrier detector block generates a carrier detect indication signal by determining if the correlation absolute value of the receive signal breaks (exceeds) the threshold level. First, the 3-bit threshold level signal on lines 652 from the set threshold circuit, as described above, is input to converter block 903. Table 3 illustrates how the 3-bit threshold level is converted to a 7-bit representation by converter 903.

TABLE 3

| B2 | B1 | B0 | Threshold | Output From Converter 903 |
|----|----|----|-----------|---------------------------|
| 0  | 0  | 1  | 32%       | 0011111 = 31              |
| 0  | 1  | 0  | 35%       | 0100010 = 34              |
| 0  | 1  | 1  | 38%       | 0100101 = 37              |
| 1  | 0  | 0  | 41%       | 0101000 = 40              |

TABLE 3-continued

| B2 | B1 | B0 | Threshold | Output From Converter 903 |
|---|---|---|---|---|
| 1 | 0 | 1 | 44% | 0101011 = 43 |
| 1 | 1 | 0 | 47% | 0101110 = 46 |
| 1 | 1 | 1 | 50% | 0110001 = 49 |

The 7-bit output 905 from converter 903 is input to 7-bit comparator 902. Additionally, the correlation absolute value of the received signal from the correlator block is input on line 901 to the comparator 902. Comparator 902 determines whether the correlation absolute value of the received signal on line 901 is greater than the 7-bit converted threshold value on lines 905. If so, the signal on line 906 is high. The CD_OFF signal on line 637 originates from the transmitter block and is input to AND gate 910. Whenever the transceiver is transmitting, CD_OFF is high and disables the carrier detect circuit 212 from outputting a high carrier detect signal on line 620. Hence, if the correlation absolute value is greater than or equal to the current threshold, and the transceiver is not transmitting, the signal CD on line 620 is high.

Thus, an adaptive threshold mechanism in a spread spectrum communications system is disclosed.

What is claimed is:

1. A transceiver for transmitting and receiving spread spectrum signals comprising:
   an input/output means for inputting spread spectrum signals to the transceiver and outputting spread spectrum signals from the transceiver;
   a transmitter coupled to the input/output means for transmitting a spread spectrum signal;
   a receiver coupled to the input/output means for receiving spread spectrum signal;
   a correlator coupled to the receiver for correlating a received signal against a known waveform, wherein a correlation value is generated based on a degree of resemblance of the received signal to the known waveform;
   a threshold means coupled to the correlator for setting a threshold;
   a means coupled to the correlator for generating a carrier detect signal whenever the correlation value of said received signal exceeds said threshold;
   a means coupled to the receiver for generating a plurality of timing windows at pre-determined time intervals following the generation of a first carrier detect signal;
   a means coupled to the correlator for generating a false carrier detect signal for each correlation value which exceeds the threshold and which does not occur within one of the timing windows;
   a determining means coupled to the means for generating the false carrier detect signal for determining a number of times false carrier detect signals have been generated within a given time period;
   an adaptive means coupled to the determining means for varying said threshold according to said number of times false carrier detect signals have been generated for the given time period.

2. The transceiver of claim 1, wherein said threshold is decreased if said number of false carrier detect signals is less than a first pre-determined number and said threshold is increased if said number of false carrier detect signals is greater than a second pre-determined number.

3. The transceiver of claim 2 is further comprised of:
   a means for incrementing said number of false carrier detect signals upon detecting said first carrier detect;
   a means for decrementing said number of false carrier detect signals if subsequent carrier detect signals occur within said timing window.

4. The transceiver of claim 3 is further comprised of a means for preventing carrier detect signals from being generated for a pre-determined duration after detection of said first carrier detect signal.

5. The transceiver of claim 4 is further comprised of a means for overriding said threshold and implementing a fixed threshold.

6. The transceiver of claim 5, wherein said spread spectrum signals are comprised of a characteristic waveform upon which said reference pattern of said correlator is based.

7. The transceiver of claim 6 is further comprised of a means for disabling said threshold adapting means when said transceiver transmits within said given 8. The transceiver of claim 7, wherein said threshold corresponds to an initial correlation value of approximately 43%.

9. The transceiver of claim 8, wherein said given time period is approximately 218 milliseconds.

10. The transceiver of claim 9, wherein said transceiver transmits and receives data at an approximate rate of 10K bits per second.

11. An apparatus for receiving digital information across a communications media comprising:
    an interface for interfacing the apparatus to the communications media;
    a transmitter means coupled to the interface for generating spread spectrum signals representing said digital information at pre-determined time intervals for transmission on said communications media;
    a receiver means coupled to the interface for receiving spread spectrum signals on said communications media;
    a correlator means coupled to the receiver means for comparing a received signal on said communications media against a stored reference pattern, wherein the degree of similarity between the received signal and the reference pattern determines a correlation value;
    a threshold means coupled to the correlation means for generating a threshold used to distinguish a valid signal from noise in regards to said received signal;
    a means coupled to the threshold means for generating a plurality of timing windows corresponding to the pre-determined time intervals;
    a counter for counting a number of times that correlation values for received signals exceed the threshold and which do not occur within the timing windows;
    a means for increasing said threshold if said number of times is greater than a first pre-determined number and decreasing said threshold if said number of times is less than a second pre-determined number.

12. The apparatus of claim 11 is further comprised of:
    a means for incrementing said number upon detecting said first correlation of said received signals which exceeds said threshold;
    a means for decrementing said number if subsequent correlations of received signals exceeding said threshold occur within said timing windows.

13. The apparatus of claim 12 is further comprised of a means for disabling correlations exceeding said threshold which follows said first correlation exceeding said threshold within a second pre-determined period of time from being included as part of said number.

14. The apparatus of claim 13 is further comprised of a means for selecting between an output of said adaptive threshold means and a fixed threshold.

15. The apparatus of claim 16 is further comprised of:
a means for detecting when said apparatus is transmitting said digital information;
a means for disabling said threshold adapting means for said pre-determined period of time if said apparatus transmits within said pre-determined period of time.

16. The apparatus of claim 15, wherein said pre-determined period of time is approximately 218 msec.

17. In a spread spectrum communications system, a method of distinguishing a valid signal from noise, said method comprising the steps of:
correlating a received signal against a known waveform;
setting a threshold, wherein a carrier detect signal is generated for correlations of received signals exceeding said threshold;
generating a plurality of timing windows at pre-determined time intervals following a first carrier detect signal;
generating a false carrier detect signal for each correlation that exceeds the threshold and which does not fall within one of the timing windows;
determining a number of false carrier detects occurring within a specified duration;
adjusting said threshold based on said number of false carrier detects.

18. The method of claim 17, wherein said step of determining the number of false carrier detects is comprised of the steps of:
incrementing a counter each time one of the correlations exceeds said threshold and is not within said timing window;
decrementing said counter when a subsequent correlation exceeding said threshold occurs within one of said timing windows.

19. The method of claim 18 is further comprised of the step of overriding said adjusting step and implementing a fixed threshold.

20. The method of claim 19 is further comprised of the steps of:
detecting when a transceiver of said spread spectrum communications system is transmitting data;
maintaining said threshold at its current level for a pre-determined duration if said transceiver transmits within said pre-determined duration.

21. The method of claim 20, wherein said pre-determined duration is approximately 218 milliseconds.

* * * * *

UNITED STATES PATENT AND TRADEMARK OFFICE
CERTIFICATE OF CORRECTION

PATENT NO. : 5,263,050

DATED : November 16, 1993

INVENTOR(S) : SUTTERLIN ET AL.

It is certified that error appears in the above-identified patent and that said Letters Patent is hereby corrected as shown below:

Column 3, line 57, delete "to maximize".

Column 14, line 21, after "said given" please insert --time period.--

Signed and Sealed this

Second Day of August, 1994

Attest:

BRUCE LEHMAN

*Attesting Officer*  *Commissioner of Patents and Trademarks*